US008184268B2

(12) United States Patent
Seeger

(10) Patent No.: US 8,184,268 B2
(45) Date of Patent: May 22, 2012

(54) METHOD FOR MULTI-TARGET-ENABLED RESOLUTION OF PHASE AMBIGUITY

(75) Inventor: Stephan Seeger, Höhenkirchen-Siegertsbrunn (DE)

(73) Assignee: Leica Geosystems AG, Heerbrugg (CH)

( * ) Notice: Subject to any disclaimer, the term of this patent is extended or adjusted under 35 U.S.C. 154(b) by 352 days.

(21) Appl. No.: 12/095,710

(22) PCT Filed: Nov. 13, 2006

(86) PCT No.: PCT/EP2006/010843
§ 371 (c)(1),
(2), (4) Date: Jul. 8, 2010

(87) PCT Pub. No.: WO2007/065528
PCT Pub. Date: Jun. 14, 2007

(65) Prior Publication Data
US 2010/0265489 A1    Oct. 21, 2010

(30) Foreign Application Priority Data
Dec. 5, 2005    (EP) ..................................... 05111695

(51) Int. Cl.
*G01C 3/08*    (2006.01)
(52) U.S. Cl. ..................................... 356/5.01
(58) Field of Classification Search .................... 356/5.1
See application file for complete search history.

(56) References Cited

U.S. PATENT DOCUMENTS

| | | | | | |
|---|---|---|---|---|---|
| 3,652,161 | A | * | 3/1972 | Ross | 356/5.07 |
| 3,778,159 | A | * | 12/1973 | Hines et al. | 356/5.11 |
| 3,900,259 | A | * | 8/1975 | Mott et al. | 356/5.12 |
| 4,075,555 | A | * | 2/1978 | Wight et al. | 324/644 |
| 4,227,194 | A | * | 10/1980 | Herman et al. | 342/25 E |
| 4,537,502 | A | * | 8/1985 | Miller et al. | 356/5.11 |
| 4,768,877 | A | * | 9/1988 | Torregrosa et al. | 356/5.15 |

(Continued)

FOREIGN PATENT DOCUMENTS
EP    1 450 128    8/2004
(Continued)

OTHER PUBLICATIONS

J.M Rueger: Electronic Distance Measurement, 4th Edition; Springer, Berlin, 1996.

(Continued)

*Primary Examiner* — Gregory C. Issing
*Assistant Examiner* — Antoine J Bedard
(74) *Attorney, Agent, or Firm* — Maschoff Gilmore & Israelsen

(57) ABSTRACT

In order to derive distance information according to the phase measuring principle, a periodic signal with at least two, in particular modulated, wavelengths $\lambda_i$ are transmitted to two or more objects, their reflections are received again and the associated phases $\phi_i$ are determined and decomposed into their individual object phases $\phi_{ij}$ which are assigned to the J objects. In order to resolve phase ambiguities, an ambiguity interval in which at least one object is located is divided into cells (5) with a defined width, with each cell (5) being assigned a counter reading and a distance. The counter reading is incremented for the cells (5) which are assigned to a possible object distance, with the incrementation being carried out for a periodicity sequential variable and for all the phases. An absolute phase or a true object distance $D_j$ from the at least two objects is determined from the distribution of the counter readings.

18 Claims, 5 Drawing Sheets

U.S. PATENT DOCUMENTS

| | | | |
|---|---|---|---|
| 5,745,437 A * | 4/1998 | Wachter et al. | 367/100 |
| 5,754,600 A * | 5/1998 | Rahnema | 375/341 |
| 5,991,308 A * | 11/1999 | Fuhrmann et al. | 370/395.53 |
| 6,088,689 A * | 7/2000 | Kohn et al. | 706/10 |
| 6,202,063 B1 * | 3/2001 | Benedikt et al. | 707/765 |
| 6,480,285 B1 * | 11/2002 | Hill | 356/492 |
| 6,731,614 B1 * | 5/2004 | Ohlson et al. | 370/320 |
| 7,233,818 B1 * | 6/2007 | Aletras et al. | 600/410 |
| 7,447,117 B2 * | 11/2008 | Yang | 367/134 |
| 7,586,620 B2 * | 9/2009 | De Groot | 356/497 |
| 7,884,947 B2 * | 2/2011 | De Lega et al. | 356/511 |
| 2004/0172375 A1 * | 9/2004 | Mogk et al. | 706/20 |
| 2007/0171964 A1 * | 7/2007 | Chen et al. | 375/227 |
| 2008/0243430 A1 * | 10/2008 | Weilenmann | 702/159 |
| 2009/0058717 A1 * | 3/2009 | Kuhn | 342/175 |
| 2009/0224969 A1 * | 9/2009 | Kolb | 342/357.04 |
| 2009/0256750 A1 * | 10/2009 | Mathews et al. | 342/450 |
| 2010/0002833 A1 * | 1/2010 | Matoba et al. | 378/44 |
| 2010/0002950 A1 * | 1/2010 | Arieli et al. | 382/255 |
| 2010/0169001 A1 * | 7/2010 | Scherzinger et al. | 701/206 |
| 2010/0169051 A1 * | 7/2010 | Peng et al. | 702/189 |
| 2010/0198083 A1 * | 8/2010 | Lin et al. | 600/484 |
| 2011/0007789 A1 * | 1/2011 | Garmany | 375/224 |
| 2011/0075928 A1 * | 3/2011 | Jeong et al. | 382/181 |
| 2011/0274212 A1 * | 11/2011 | Edler Von Elbwart et al. | 375/308 |

FOREIGN PATENT DOCUMENTS

| | | |
|---|---|---|
| WO | 2004/074773 | 9/2004 |
| WO | 2007/022927 | 3/2007 |

OTHER PUBLICATIONS

R. Joeckel & M. Stober: Elektronische Entfernungs-Und Richtungsmessung [Electronic Distance and Direction Measurement], 4th Edition; Wittwer, Suttgart, 1999.

Musch, et al., "A Multiple Taregt High Precision Laser Range Measurement System Based on the FMCW Concept", 33rd Eurpeon Microwave Conference, Munich 2003.

Musch T. et al: "A Multiple Target High Precision Laser Range Measurement System Based on the FMCW Concept," Microwave Conference, 2003. 33rd European Oct. 7-9, 2003, Piscataway, NJ, USA , IEEE, vol. 3, Oct. 7, 2003, pp. 991-994.

* cited by examiner $2\pi + \pi + \pi/4 = (13\pi)/4$
$2\pi + 2\pi + 2\pi + \pi/2 = (26\pi)/4$

METHOD FOR MULTI-TARGET-ENABLED RESOLUTION OF PHASE AMBIGUITY

The invention relates to a method for multi-target-enabled resolution of a phase ambiguity, a computer program product and a range finder.

In the area of non-contact distance measurement, various measuring principles and methods of measurement are known, which are described, for example, in the textbooks "J. M. Rüeger: Electronic Distance Measurement, 4$^{th}$ Edition; Springer, Berlin, 1996" and "R. Joeckel & M. Stober: Elektronische Entfernungs- and Richtungsmessung [Electronic Distance and Direction Measurement], 4$^{th}$ Edition; Verlag Konrad Wittwer, Suttgart, 1999". Commercially available electrooptical rangefinders operate chiefly according to the principle of phase measurement or that of pulse transit time measurement; cf. for example Joeckel & Stober, Chapter 13.

The mode of operation of these devices consists in emitting modulated electromagnetic radiation, for example intensity modulated light, to the targets to be measured and subsequently receiving one or more echoes from the back-scattering objects, which are ideally exclusively the targets to be measured. The signal evaluation of the received echoes is a standard technical task for which a multiplicity of solutions was realised, in particular with the use of optical systems.

Phase-measuring systems must solve the problem of the phase ambiguity. The phase or phase shift measured by a phase meter is not unambiguous since distances which differ by integral multiples of the wavelength lead to the measurement of an identical phase. For resolving the phase ambiguity, a plurality of measurements at different carrier wavelengths are generally used. The distance is then determined from the measured phase shifts.

For many applications, in particular in geodesy and the construction industry, tacheometers or other devices which are equipped with rangefinders measuring without reflectors according to the phase measuring principle have increasingly become established in recent years.

Reflectorless distance measurement often leads to situations in which the measuring beam emitted by the rangefinder simultaneously strikes a plurality of objects which need not always be target objects. This happens, for example, in the surveying of an edge; if it is sighted, a part of the beam strikes the actual target object to be surveyed at the edge while another part of the beam illuminates an object located behind or the floor. A further example is a retroreflector which is located in the vicinity of a weakly reflecting target object and directs scattered light into the receiver of the rangefinder. A similar situation occurs if the beam, unintentionally and often also unnoticed, strikes objects between the actual measured object and the instrument, for example in the case of distance measurements through window panes, branches of trees or wire fences.

In such multi-target situations, a conventional phase meter which outputs a single distance generally gives a false measurement; i.e. a measured distance value which contains an error which is well outside the specified accuracy of measurement. Transit time meters can more easily recognise and handle multi-target situations if the targets are so far apart or the transmitted pulses cover a sufficiently short time span that the echoes thereof can be detected and kept apart.

In spite of the advantages of transit time meters, most customary tacheometers are equipped with phase meters because only in this way can they achieve the required accuracy of distance measurement in the mm or even sub-mm range with an effort acceptable for applications in the field. The reliability of these devices is substantially increased if their phase meters have multi-target capabilities.

Thus, for example, WO 2004/074773 or EP 1 450 128 discloses a multi-target-enabled hybrid system for deriving geodetic distance information, in which a light signal is emitted to one or more targets. Device components, such as transmitters and receivers are modelled together with the targets as a linear time-invariant system which is excited by a signal and the system response of which is recorded. In contrast to pure transit time or phase meters, the distance information is derived both from the time-related shift and from the signal shape of the system response.

U.S. Pat. No. 4,537,502 discloses a method for distance determination for individual targets by means of the emission of radiation at a plurality of discrete frequencies. The phase shift is determined for the radiation reflected by the target. The ambiguity interval relevant for the measurement is divided into cells representing distances and having coordinated counters, and the counters of the cells corresponding to the ambiguities of the phase shift are incremented. The distance to be measured for the individual target is determined on the basis of the cell with the highest counter reading.

In the European patent application with the application number 05107764.2 or the International PCT application with the application number PCT/EP2006/008184, a multi-target-enabled distance measuring method according to the pure phase measurement principle is described, with emission of periodic signals at different times and sampling of received signals, in which distances to a plurality of targets are simultaneously determined. Here, a statistical parameter estimation problem based on a mathematical signal model is solved so that the number of targets is specified for more than one target or in principle the number of targets is determined by the method. In this application, an approach for decomposing the received signals into the individual phases which can be assigned to the respective targets is also described. However, this distance measuring method is complex and is based on the solution of a parameter estimation or optimisation problem having a large number of dimensions.

Thus, the multi-target capability not technically realised or realised only with considerable effort, e.g. in hybrid systems, for phase meters or unfavourable transit time behaviour or high complexity of the algorithm proves to be a substantial disadvantage of all distance measuring principles known to date, once again only phase meters providing the accuracy required for many applications with acceptable effort.

The object of the present invention is thus to provide a faster or simplified multi-target-enabled method for resolving a phase ambiguity or for phase measurement.

A further object of the invention is to provide such a method of measurement which is also very robust with respect to noise and measurement errors in the measured phase values.

A further object of the invention is to permit a correct resolution of the phase ambiguity in the case of multiple targets, in which an assignment of the measured phase values to the individual targets is not necessarily specified. Here, the evaluation should in particular also have favourable transit time behaviour.

These objects are achieved, according to the invention, by the subjects of Claims 1 and 16, respectively, or the dependent claims, or the solutions are further developed.

For distance measurement, signal-carrying radiation is generated and is emitted in the direction of a target object to be surveyed with respect to the distance.

Signal-carrying radiation which may be used is, for example, electromagnetic radiation, such as, for example, laser light, but the method according to the invention, is also suitable for mechanical waves, e.g. sound waves. The radiation or wave scattered back by the target object is received, electronically processed and evaluated. For electromagnetic radiation, the wavelength may be both in the visible and outside the visible range, e.g. in the radar range.

The method according to the invention permits the determination of the distance to M targets, possibly located one behind the other, M in principle having no upper limit, by means of phase values $\phi_{ij} \in [0, 2\pi]$ which are determined in an arbitrary manner, correspond to J different wavelengths $\lambda_j$, $1 \leq j \leq J$, and need not necessarily be assigned to the individual targets, i.e. $\phi_{ij}$ does not inevitably correspond to target i where $i = 1 \ldots M$.

For the relationship between the distance $R_i$ to target i with $i = 1 \ldots M$ and phase values $\phi_{ij}$ correctly assigned to the targets, the following is true $$2R_i = \frac{\varphi_{ij}}{2\pi} \lambda_j + N_{ij} \lambda_j + \varepsilon_{ij}, \quad i = 1, \ldots, M; \quad j = 1, \ldots, J \quad (1)$$

with unknown integral values $N_{ij}$ and unknown noise quantities $\varepsilon_{ij}$ which result from measurement errors in the phases $\phi_{ij}$ or from measurement errors in the quantities from which the phases $\phi_{ij}$ are derived. The factor 2 before $R_i$ takes into account that the signal covers the path from the sensor to the target and, after reflection, covers the same path again back to the sensor.

Below, the method is explained purely by way of example for the case of electromagnetic radiation. Here, the radiation to be emitted is modulated with at least two wavelengths $\lambda_j$ during or after generation. If the target object is located outside a distance which exceeds the greatest of the wavelengths used for modulation, it is not possible to determine an unambiguous distance from the measurement of a single phase $\phi$ alone since the absolute phase can be determined as a distance equivalent only to a multiple of the wavelength.

For solving this phase ambiguity, the possible or expected ambiguity interval is discretized by dividing it into cells of a defined width. The ambiguity interval can simply be equated to the maximum measurable distance or can be limited by a preliminary measurements or estimations.

The width of the cell can be chosen, for example, as a function of a predetermined accuracy of measurement. In addition, a counter is assigned to each cell. The algorithmic resolution of the phase ambiguity for a measured phase $\phi_j$ is effected by changing the counter reading of a counter for the cells which are assigned to a distance $R_N(\phi_j) = \phi_j / 2\pi \cdot \lambda_j / 2 + N \cdot \lambda_j / 2$. In the simplest case, the counter is in each case incremented by one or is decremented from a specified starting value. The natural number $N \in \mathbb{N}$ describes the ambiguity of the phase measurement, i.e. the periodicity of the phases, so that the value for N is increased stepwise and the counter of the respective assigned cell is changed. The distance $R_N(\phi_j)$ and the assigned cell thus represent a distance to the target object which is possible for the respective measured phase, or the assigned absolute phase.

The phase values may relate to arbitrary periodic signals, i.e. in particular modulated electromagnetic waves, sound waves, water waves or tyres of a different diameter.

The step comprising the stepwise increase of counters for all suitable $N \in \mathbb{N}$ as a control variable for the periodicity is effected for all phase shifts $\phi_j$ and hence for all wavelengths. As a result, a distribution of the counter readings in the cells follows. The distance to the at least one target object and/or the corresponding absolute phase for a considered wavelength $\lambda_j$ is then determined on the basis of the maximum of the distribution or the highest counter reading.

The representation of the cells in the form of a data structure can be effected in various forms. Since a counter reading differing from zero is generated only in a part of the cells, for example, a binary search tree or a hash table can also be used in addition to the data structure of a field.

If simultaneous distance measurement to a plurality of target objects is to be effected, the situation is a multi-target case in which the assignment of the individual phases to the targets may no longer exist and the mixed individual phases of the reflections from the different target objects are received by the receiver so that the individual phases have to be extracted again as a measured phase from the measured phases. A vectorial decomposition of the measured phase into the individual phases, based on the Carathéodory theorem, is successful, for example, if at least the two harmonic amplitude components in the received signal are evaluated. Such a single-target phase decomposition, as also described in the European patent application with the application number 05107764.2, permits the direct use of the method according to the invention for resolving phase ambiguities.

Regardless of whether such an assignment of the phases to the targets is present or not, the method according to the invention can be carried out in the same manner as in the single-target case.

For each phase $\phi_{ij}$, an incrementation of the counters of the cells coordinated with a distance $R_N(\phi_{ij}) = \phi_{ij} / 2\pi \cdot \lambda_j / 2 + N \cdot \lambda_j / 2$ is effected. The individual phases are processed separately. The distance to the targets follows directly from the greatest local maxima of the frequency distribution.

Thus, the method according to the invention has the following elements from the algorithmic point of view a.) a conversion routine for deriving from a phase value $\phi_\lambda \in [0, 2\pi]$, which corresponds to the wavelength $\lambda$, all possible distances $R_N$ fitting this $$R_N(\varphi_\lambda) = \frac{\varphi_\lambda}{2\pi} \frac{\lambda}{2} + N \frac{\lambda}{2} \quad \text{with} \quad N = 0, 1, 2, \ldots, N_{max} \quad (2)$$

b.) a map which produces a correspondence to at least one of the storage cells of a storage module for a specified distance R. Each such storage cell corresponds in this way to a certain small distance range of the quantity $\Delta R$. The storage cell may in this way correspond to an index which is given, for example, by $$n = \text{integer}\left(\frac{R}{\Delta R}\right) \quad (3)$$

c.) a routine which increments the content of all storage cells which correspond via a) and b) to a phase value, e.g. increments by at least 1. Each storage cell thus serves as a counter which logs how many phase values correspond to the distance range which is assigned to this storage cell.

d.) a routine which, after all phase values have been processed by means of the routine c) in arbitrary sequence, determines the M storage cells with the most entries. These storage cells correspond in each case to small distance ranges in which the M targets are present since these distance ranges are compatible with a maximum number of phase values. If n is, for example, the index assigned to such a storage cell, then a target is present in the distance between $n\Delta R$ and $(n+1)\Delta R$.

In an algorithmic notation, the method according to the invention can then be represented as follows:

1. Division of the ambiguity interval into individual cells having the size of the expected or acceptable error, each cell being assigned to a distance.
2. Incrementation of a counter for the cells which are assigned to the distance $R_N(\phi_{ij})=/2\pi \cdot \lambda_j/2 + N \cdot \lambda_j/2$ for all relevant N.
3. Repetition of step 2 for all phases, i.e. for all j and, in the multi-target case, also for all i, a preceding decomposition into single-target phases being effected here.
4. The distances assigned to the target objects are determined on the basis of the maxima within the distribution of counter readings.

There are different variants for the basic algorithm.

According to the invention, alternative realisations, for example in which a specified counter reading is reduced so that a search for minima of the distribution takes place, also correspond to the formulation of the algorithm with an incrementation. For example, the number of wavelengths used or, in the multi-target case, the product of the number of wavelengths and the number of target objects could be set as the starting value of the counter.

According to the invention, the method can also be carried out in a plurality of stages. Thus, a first estimation is possible, for example with regard to the number of target objects present, by a coarse search run with subdivision of the ambiguity interval into only a few cells of greater width. From points of view of transit time, a limitation of the distance range to be analysed can thus also be effected. By a coarse identification of the target objects and of the distance ranges within which the target objects can be present, the number of multiples of the wavelengths to be passed through can be limited. From the algorithmic point of view, value ranges are thus established for each wavelength so that only the absolute phases which are actually suitable are considered.

Instead of incrementing the counters in a storage cell corresponding to a distance by one or subtracting them from a known value, it is also possible according to the invention to use alternative methods, for example for avoiding quantisation effects which result from the random distribution of the entries over two storage cells belonging to adjacent distance ranges if the distance to a target corresponds exactly to the distance in between, i.e. the distance falls between two storage cells. Another problem arises if, when ranges ΔR are chosen too small, and accumulation of entries in the storage cells no longer occurs owing to measurement inaccuracies in the phase values $\phi_{ij}$.

For example, the following methods are suitable for such avoidance of quantisation effects:

a.) For each value of $R_N$ it is possible to make entries in two data structures in which the cells are shifted in their importance by ΔR/2.

The maxima sought, which correspond to the distances to the targets, must in this way also be present in different data structures. In the case of M targets, the greatest M peaks which correspond to different distances are then chosen across both frequency tables.

b.) Instead of incrementing only the counters in the cell $$n = \text{integer}\left(\frac{R_N}{\Delta R}\right)$$

for $R_N$ by 1, it is possible, where $$\text{modulo}\left(\frac{R_N}{\Delta R}\right) \geq 0.5,$$

to increment counters in the cells n and n+1. Where $$\text{modulo}\left(\frac{R_N}{\Delta R}\right) < 0.5,$$

the counters in the cells n and n−1 can be correspondingly incremented. In this case, in contrast to a.), only one frequency table is used.

c.) It is possible—without taking into account $$\text{modulo}\left(\frac{R_N}{\Delta R}\right)$$

—always to increment the counters in the cells n−1, n and n+1 in each case by 1 for each entry, where $$n = \text{integer}\left(\frac{R_N}{\Delta R}\right).$$

This procedure can be carried out directly during entries in the frequency table or alternatively after all entries have already been made in the exact cell n. In the latter case, if the counter is at q in a storage cell n, the counters in the storage cells n−1 and n+1 are each increased by q. Mathematically, this corresponds to a convolution of the original frequency distribution with a box function of width 3 and height 1.

d.) Instead of incrementing the counters in the storage cells n−1, n, n+1 in each case by 1 as in c.), the storage cell n can be incremented by a large value, for example 2, and the storage cells n−1 and n+1 by a smaller value, for example 1. Once again, this procedure can be carried out directly during entry or after the entry of all phase values. Mathematically, this corresponds to a convolution of the original frequency distribution with a triangular function of width 3 and maximum height 2. Alternatively, this may also be considered as a double convolution of a box function of width 2 and height 1 with the original frequency distribution.

Other convolutions with greater convolution kernels than in c.) and d.) are also possible according to the invention but these are not necessary for solving the discretization problem. However, greater convolution kernels can solve other problems, such as, the problem of a lack of accumulation of phase values.

Convolution kernels of greater dimension also make it possible to collect isolated entries in the frequency table. Typical convolution kernels are splines of arbitrary order. $1^{st}$ order splines are customary box functions, and $2^{nd}$ order splines are triangular functions. In general, n th order splines can be recursively generated from splines of orders n−1 by convolution with a box function, i.e. a $1^{st}$ order spline. Infinitely frequent convolution finally leads to a Gauss curve. In the end, it is unimportant whether the frequency distribution is convoluted identically with a n th order spline or whether an n-fold convolution with the box function is preferred, but the direct convolution with a n th order spline is more efficient.

Splines offer natural access to different resolution stages. Thus, convolution can also be effected with splines of different resolution stages.

The convolution kernel is correlated to the probability distribution of the measurement errors of a phase value. If it is considered that, in the approach described, the values for different phase values are added to one another in the storage cells—instead of being multiplied by one another—the convolution kernel can be interpreted as the logarithm of the probability distribution (accept for one factor).

Conversely, it is true that—if the value 1 is the starting value of each cell of the frequency table and the convolution kernel is considered directly as a not yet normalised probability distribution—it is also possible to multiply the hitherto existing value with the value of the convolution kernel—which then must always be greater than 1—instead of incrementing or detrementing a counter in a storage cell.

Since the signal/noise ratio of the measured phases is frequently known, confidence values $\kappa_{ij}$ for the individual measured phases are available in such a case. The entries in the frequency table can be made taking into account these confidence values. Thus, if the phase value $\phi_{ij}$ corresponds to a storage cell, the counter of the storage cell can also be incremented by $\kappa_{ij}$ (or a function dependent on $\kappa_{ij}$) instead of by 1. The same applies in the case of convolution kernels.

In the conversion routine, instead of an individual phase value $\phi \in [0, 2\pi]$, it is also possible to consider the combination of $j_0 \leq J$ phase values which correspond to different wavelengths. In this case, the routine c) must be called up for all combinations of the $j_0$ tuple $(\phi_{\lambda_1}, \phi_{\lambda_2}, \ldots, \phi_{\lambda_{j_0}})$, since it is not clear whether the phase values correspond to the same target and since no phase combination should be ruled out from the outset. For the combination of $j_0=2$ phases in the case of J frequencies and 2 targets, owing to the lack of assignment of the phases to the targets, it is therefore necessary to consider not only the phase combinations $(\phi_{1,\lambda_1}, \phi_{1,\lambda_2}), (\phi_{1,\lambda_1}, \phi_{1,\lambda_3}), \ldots, (\phi_{1,\lambda_1}, \phi_{1,\lambda_J}), (\phi_{1,\lambda_2}, \phi_{1,\lambda_3}), \ldots, (\phi_{1,\lambda_2}, \phi_{1,\lambda_J}), \ldots (\phi_{1,\lambda_{J-1}}, \phi_{1,\lambda_J})$ and the same with in each case the first index 2, but also the mixed combinations between index 1 and index 2, i.e. for example, instead of $(\phi_{1,\lambda_1}, \phi_{1,\lambda_2})$ and $(\phi_{2,\lambda_1}, \phi_{2,\lambda_2})$, it is now necessary to take into account all 4 combinations $(\phi_{i,\lambda_1}, \phi_{k,\lambda_2})$ with $i,k \in \{1, 2\}$. For example, only the distances for which $$\frac{\varphi_{\lambda_1}}{2\pi}\lambda_1 + N_1\lambda_1 = \frac{\varphi_{\lambda_2}}{2\pi}\lambda_2 + N_2\lambda_2$$

or $2R_{N_1}(\phi_{\lambda_1})=2R_{N_2}(\phi_{\lambda_2})$ for short exists correspond to the combination of $j_0=2$ phase values. These distances can be obtained directly via a 2-dimensional (in general $j_0$-dimensional) phase diagram or (for $j_0=2$) via so-called laning methods. By going over to the so-called widelane, the phase value $\phi_\lambda = \phi_{\lambda 2} - \phi_{\lambda 1}$ is obtained at the wavelength $$\lambda = \frac{\lambda_1 \lambda_2}{\lambda_1 - \lambda_2}$$

(wavelength $$\lambda = \frac{c}{f}$$

which belongs to the frequency $f=f_2-f_1$ with the frequencies $$f_i = \frac{c}{\lambda_i}, (i = 1, 2)).$$

This phase value corresponds to distances $$2R_N(\varphi_\lambda) = \frac{\varphi_\lambda}{2\pi}\lambda + N\lambda$$

or, after introduction of $\phi_\lambda$ and $\lambda$ $$2R_N(\varphi_{\lambda_1}, \varphi_{\lambda_2}) = \frac{\varphi_{\lambda_1} - \varphi_{\lambda_2}}{2\pi} \frac{\lambda_1 \lambda_2}{\lambda_2 - \lambda_1} + N\frac{\lambda_1 \lambda_2}{\lambda_2 - \lambda_1} \quad (4)$$

with $N = 0, 1, 2, \ldots, N_{max}$

The following is true $$R_N(\phi_{\lambda_1}, \phi_{\lambda_2}) = R_{N_1}(\phi_{\lambda_1}) = R_{N_2}(\phi_{\lambda_2}) \text{ with } N=N_1-N_2 \quad (5)$$

i.e. $R_N(\phi_1, \phi_2)$ for $N=N_1-N_2$ are the distances for which $R_{N_1}(\phi_{\lambda_1})=R_{N_2}(\phi_{\lambda_2})$ is true. For general $N=0, 1, 2, \ldots, R_N(\phi_1, \phi_2)$ are the distances for which $R_{N_1}(\phi_{\lambda_1}) \approx R_{N_2}(\phi_{\lambda_2})$. $R_N(\phi_1, \phi_2)$ thus counts the candidates for $R_{N_1}(\phi_{\lambda_1})=R_{N_2}(\phi_{\lambda_2})$ for general N.

The mapping of a distance R onto a storage cell in routine b.) can be realised in the simplest case via an array, i.e. via an uninterrupted storage block in which storage cell 1 corresponds to distance 0 to $\Delta R$, storage cell 2 to $\Delta R$ to $2\Delta R$, etc. Alternatively, however it is also possible to use any type of search data structure which responds to one storage cell or possibly a plurality of storage cells for a specified index $$n = \text{integer}\left(\frac{R}{\Delta R}\right).$$

(Binary) search trees, hash tables, skip lists and any type of tries may be mentioned here as examples. A more detailed description of these structures is to be found, for example, in Robert Sedgewick, *Algorithms in C, Parts 1-4: Fundamentals, Data Structures, Sorting, Searching*, Addison Wesley, 1998. Such "sparse" data structures are important in particular in the case of small $\Delta R$ and limited storage resources. They make it possible to use no stores for distances to which no phase values correspond. Thus, $\Delta R$ can be chosen to be arbitrarily small. All these data structures are to be referred to below as frequency tables.

The determination of the maxima need not necessarily take place at the end of the entry of all phase values but can also be logged during the entry. This is possible in particular when a very large array which resolves the range from R=0 to $R=R_{max}$ very accurately, i.e. with a small $\Delta R$, is used for the frequency table.

Particularly in the case of the above-described methods for avoiding quantisation effects and for treating inaccuracies of measurement, the cells directly adjacent to the maximum peak contain a very large number of hits. In order to avoid incorrectly detecting these as targets, it is not possible theoretically to accept as a target all cells in the environment of a found peak as long as the number of hits decreases monotonically.

In addition to the multiple resolution in the case of the convolution kernels, it is also possible—as already discussed above—to carry out a multiple resolution in the case of choice of $\Delta R$. For this purpose $\Delta R$ is first chosen to be relatively large so that, when an array is chosen as the frequency table, it is possible to manage with a relatively small storage space. If the distances to the targets are thus relatively coarse, i.e. determined with the accuracy $\Delta R$, these ranges can subsequently be divided more accurately. This can always be further refined in a recursive manner. It should be considered that, if ΔR is initially chosen to be too large, an unambiguous peak may not form since the peak disappears in the noise.

The method according to the invention can be parallelized virtually as desired, for which purpose, for example, the following approaches are available:

The individual phase values can be entered in the frequency table in parallel by different processor units.

Entries in different distance ranges can be made in parallel by different processor units, e.g. processor unit 1 for distances between 0 and 10 m, processor unit 2 for distances between 10 and 20 m, etc.

Combination of methods a.) and b.).

The detection of the maxima in the frequency table can be effected (very substantially) in parallel if different processor units analyse storage cells for different distance ranges.

The method according to the invention can also serve as a preprocessing step for determining candidates for the distances to a plurality of targets. These candidates then reduced in numbers can subsequently be investigated more exactly by means of an evaluation function. On the basis of the reduced number of candidates, the evaluation function in turn can be chosen to be more complicated without the transit time behaviour being too unfavourable.

With the method according to the invention, a plurality of phase measurement series can be entered in a common frequency table over time without modifications. This is suitable in particular in the case of stationary targets and/or poor signal/noise ratio. If measurement series at different times lead to peaks at different distances—although it is known that the targets involved are stationary—a most probable distance is automatically determined.

The method according to the invention for resolving a phase ambiguity is described in more detail below, purely by way of example, with reference to working examples shown schematically in the drawing. Specifically FIG. 1a-b show the diagram illustrating the principle of a phase measurement method according to the prior art;

Figure 1A:
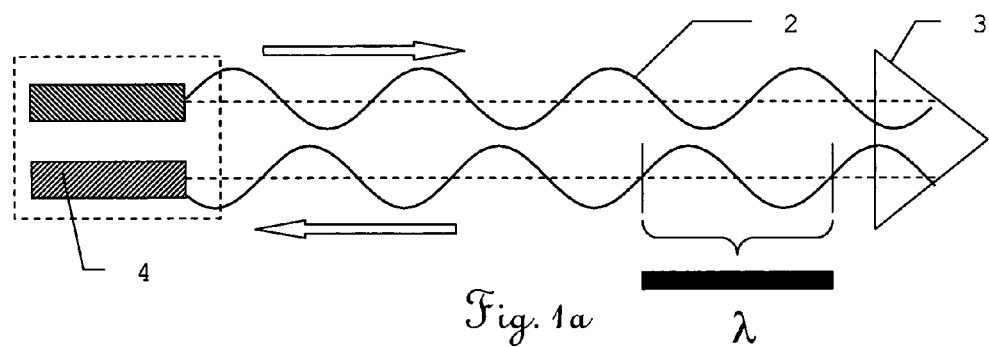
Figure 1B:
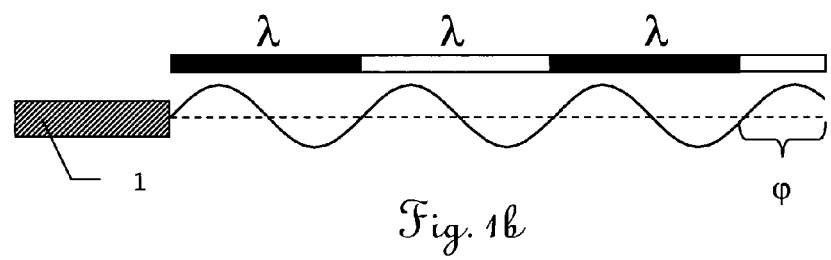

FIG. 1a-b show the diagram illustrating the principle of a phase measurement method according to the prior art in which the distance between a device and a target is determined.

In FIG. 1a, a carrier wave with a signal modulated upon it, for example a modulated light signal as light wave 2, is emitted by a transmitter 1 to a target which may have a retroreflector 3 and is reflected back from there to a receiver 4. In contrast to the transit time method, no time difference is registered between emission and reception. The shift of the phase of the incoming and outgoing signal is recorded. This phase q is dependent on the distance between device and target since the distance corresponds to a multiple of the wavelength λ of the emitted light wave 2 and a remaining residual. The residual represents the nonintegral component remaining on division of the distance by the wavelength λ, as shown in FIG. 1b. The measured phase φ is a measure of the residual, so that, with the knowledge of this phase φ and the number of wavelengths λ, the distance between measuring device and target can be derived. Since the number of wavelengths λ is not directly determined as an integral component in this method, an additional resolution of this ambiguity or phase ambiguity must be effected. This can be effected, for example, by the use of a plurality of modulation frequencies—typically from 2 to 8—for which the absolute phase of the received signal is calculated sequentially relative to the transmitted signal. The distance to the target object can then be derived from the plurality of these measurements.

Figure 9:
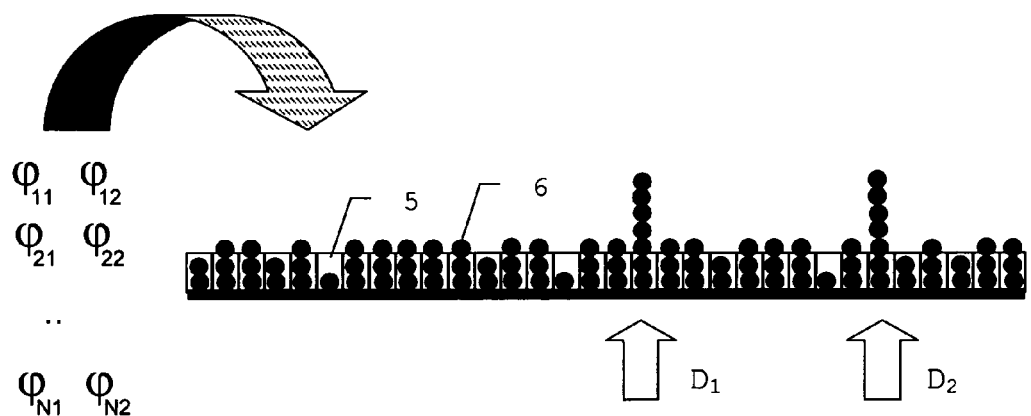
FIG. 9 shows the diagram illustrating the principle of the method according to the invention for resolving a phase ambiguity for the multi-target case.

The method according to the invention is based on the fundamental principle of classical phase measurement but, owing to the different evaluation of the measured phases, has advantages, in particular with regard to the transit time behaviour and the robustness to noise and outliers in the measured phase values. A diagram illustrating the principle of the method according to the invention for resolving a phase ambiguity for the multi-target case is shown in FIG. 9.

Figure 2:
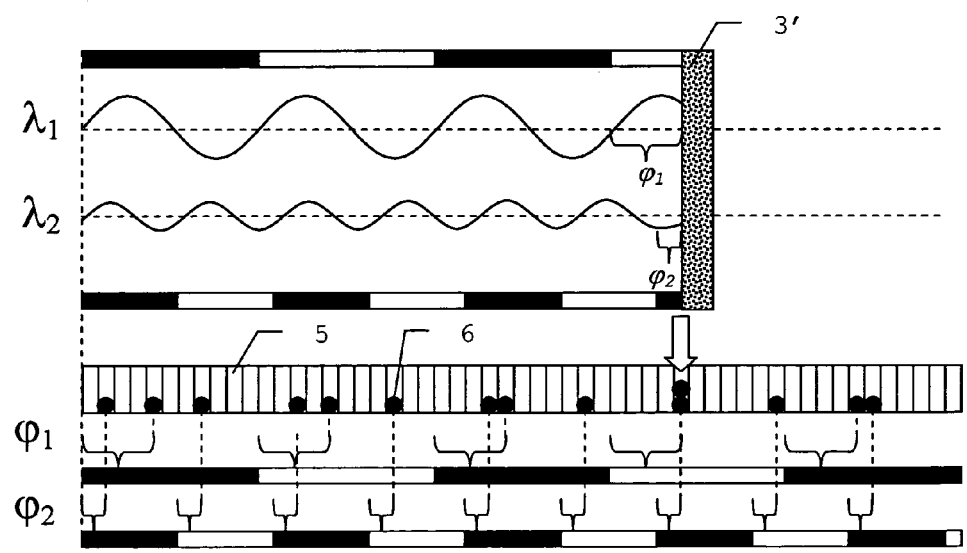
FIG. 2 shows the diagram illustrating the principle of a method according to the prior art for resolving a phase ambiguity for the single-target case.

The prior art discloses methods for resolving phase ambiguities which likewise utilise the emission of electromagnetic or other radiation with a periodic signal, e.g. sound waves, and the reflection thereof by a target object 3'. Such a method is explained purely by way of example in FIG. 2. There, the radiation has at least two wavelengths $\lambda_1$ and $\lambda_2$, for each of which the associated phases $\phi_1$ and $\phi_2$, are measured. The ambiguity interval, which is specified here by the distance range, in which the target object 3' may be present is divided into individual cells 5. Each cell 5 is assigned a counter, the counter reading of which is illustrated here by a sphere 6. For the case of target object 3' and two wavelengths $\lambda_1$ and $\lambda_2$, considered by way of example here, the counters are now incremented by assigning to the distance represented by the measured phases $\phi_1$ or $\phi_2$ a cell whose associated counter is incremented by one, which corresponds graphically to the deposition of a sphere 6 in the respective cell 5. To take into account the ambiguity which permits a determination of the distance only to a multiple of the wavelength λ or $\lambda_2$, the process is carried out for a growing number of multiples of the wavelengths $\lambda_1$ and $\lambda_2$. After the end of the method for all wavelengths and possible multiples, the counters of some cells are incremented by a certain amount. In this simple case, the counter of a single cell 5 has the value two, which is expressed by two spheres 6 in this cell 5. The distance assigned to the cell 5 represents the true target distance of the target object 3'.

In addition to static applications in which a stationary target object is surveyed, it is also possible to adopt a dynamic procedure by producing a plurality of divisions of the ambiguity interval as frequency tables. The frequency tables are thus multiple copies of a division. Here, each frequency table is assigned to a period and in each period the phases $\phi_j$ relating to the time are sorted into the frequency table assigned to the period. The various frequency tables can then be isolated and also correlated to one another, e.g. assuming a constant speed of the target object, which speed manifests itself in a corresponding shift of the frequencies or counter readings within the time-ordered frequency tables.

Figure 3:
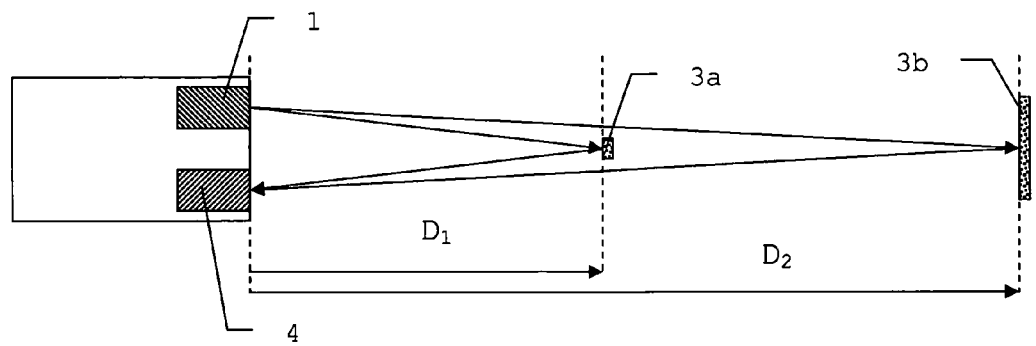
FIG. 3 shows the schematic diagram of the multi-target case.

FIG. 3 schematically shows the conditions for a distance measurement in the multi-target case. A signal is emitted by the transmitter 1 and is now reflected by a plurality of targets which are embodied here by way of example by an object as first target 3a at a target distance $R_1$ and a further object as second target object 3b at a target distance $R_2$, which reflection is detected by the receiver 4. The components of the two target objects 3a and 3b are thus superposed on one another in the receiver so that the latter receives only a single signal which has one phase and comprises components of the two individual phases.

Figure 4:
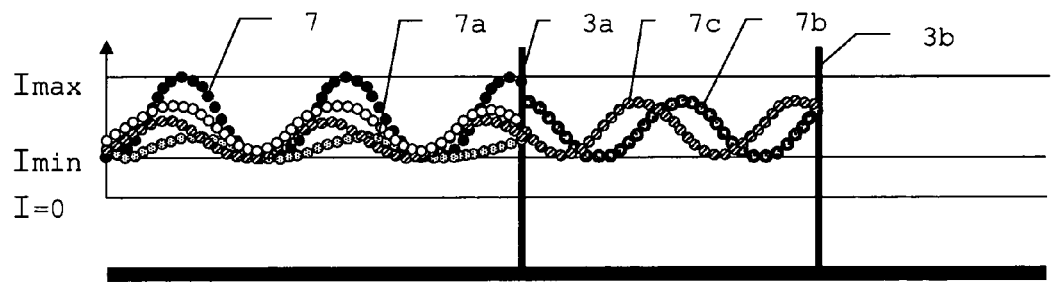
FIG. 4 shows the schematic diagram of the phases for the multi-target case.

FIG. 4 shows the schematic diagram of the phases for the multi-target case. The emitted radiation 7 now strikes the first target object 3a, from which a first radiation component 7a is reflected back. The remaining part, for example after transmission in the case of a transparent first target object 3a, as second radiation component 7b strikes the second target object 3b, which is considered here to be opaque. The third radiation component 7c reflected back by the second target object 3b finally strikes the receiver again. This always registers the superposed first and second radiation components 7a and 7c with a common multi-object phase.

Figure 5:
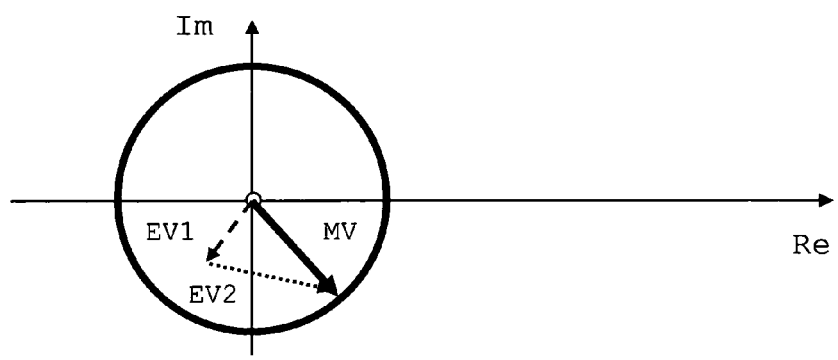
FIG. 5 shows the polar diagram of the phases for the multi-target case.

The polar diagram, corresponding to FIG. 4, of the phases for the multi-target case is shown in FIG. 5. The multi-target vector or multi-object vector MV, which represents the received signal comprising the superposed first and second radiation components is shown. Here, the term multi-object means that objects which are not considered in the actual sense as a target to be surveyed can also make contributions to the received radiation. The multi-object vector MV is composed of a first single-object vector EV1, which corresponds to the first radiation component and a second single-object vector EV2, which corresponds to the second radiation component. If the measured multi-object vector MV is decomposed into the vectorial components, the corresponding single-object phases can be derived and the method according to the invention can also be applied directly to the multi-target case or multi-object case. It should be noted that an arbitrary number of decompositions into single-object vectors EV1 and EV2 exists, which decompositions generate the measured multi-object vector MV.

Figure 6:
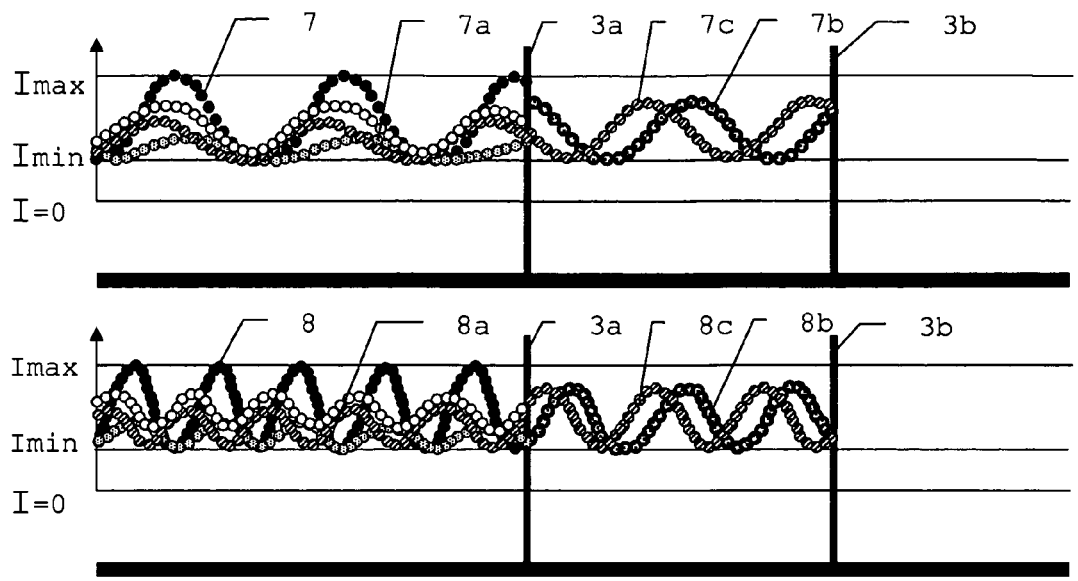
FIG. 6 shows the schematic diagram of the phases for the multi-target case with the use of the second harmonic.

Such an unambiguous decomposition is possible, for example, if higher harmonic components are also taken into account in signal reception and signal evaluation. FIG. 6 schematically shows the phases for the multi-target case with the use of the second harmonic. For radiation 8 emitted according to the second harmonic with double frequency, similar conditions are now applicable. The higher-harmonic radiation 8 likewise strikes the first target object 3a, by which a first higher-harmonic radiation component 8a is reflected back. The remaining part reaches the second target object 3b as second higher-harmonic radiation component 8b. The third higher-harmonic radiation component 8c reflected back by the second target object 3b finally strikes the receiver again. This likewise registers the superposed first and second higher-harmonic radiation components 8a and 8c with a common higher-harmonic multi-object phase.

Figure 7:
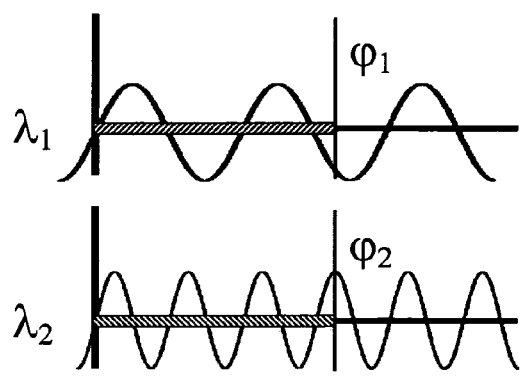
FIG. 7 shows the relationships with the use of the second harmonic.
Figure 8:
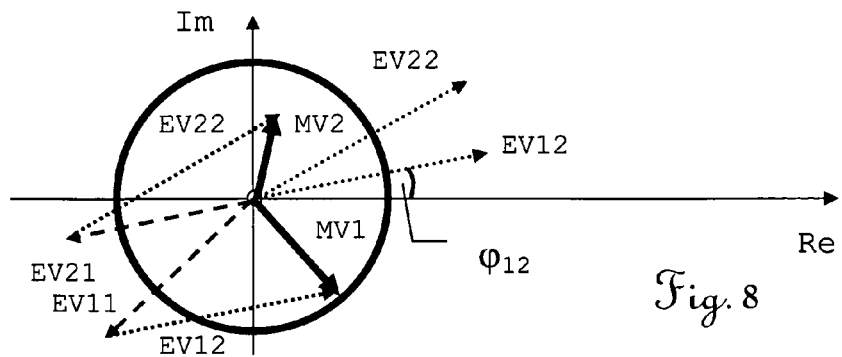
FIG. 8 shows the schematic diagram of the vectorial decomposition into individual phases for the multi-target case.

FIG. 7 shows the relationships when the second harmonic is used for a special distance of the target object. Since the wavelength of the second harmonic is halved, the absolute phase thereof doubles. A knowledge of this phase relationship permits a decomposition into the single-object phases, which is explained schematically in the polar diagram in FIG. 8. According to the Carathéodory theorem, there exists an unambiguous decomposition of the multi-target vector if further information is present, for example through the second harmonic, so that decomposition and derivation of the associated single-object phases are possible. The multi-object vector MV1 is decomposed into the single-object vectors EV11 and EV12 or the multi-object vector MV2 is decomposed into the single-object vectors EV21 and EV22. From a knowledge of a single-object vector, the associated phase can then be derived, as shown here by way of example for the single-object vector EV12 and the single-object phases $\phi_{12}$.

FIG. 9 shows the diagram illustrating the principle of the method according to the invention for resolving a phase ambiguity for the multi-target case. For each of the single-object phases $\phi_{ij}$, the step of incrementing the counters is carried out, so that finally a distribution of counter readings follows, from which the true target distances $R_1$ and R2 can be derived, which is effected in this example by identification of the two highest counter readings. In the multi-target case too, the method can be made dynamic as described for FIG. 2 for moving target objects.

Figure 10:
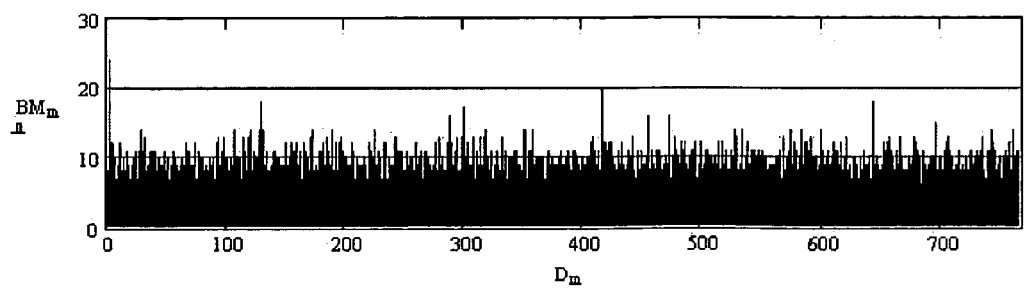
FIG. 10 shows the overall diagram of an example of the method according to the invention for the multi-target case.
Figure 11:
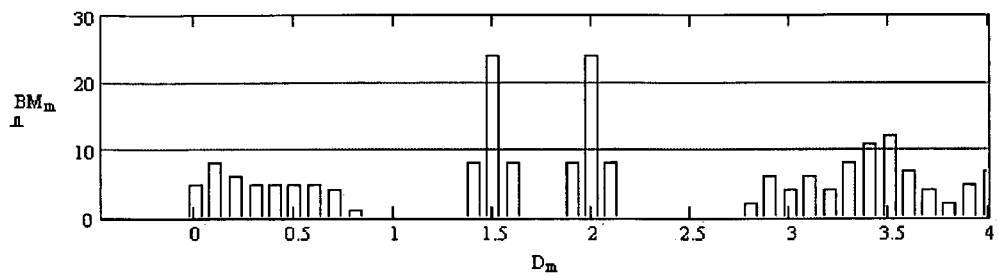
FIG. 11 shows the cut-out diagram of the example of the method according to the invention for the multi-target case.

An example of the method according to the invention for the multi-target case is shown in FIG. 10 and FIG. 11, FIG. 10 comprising the total diagram of the ambiguity interval and FIG. 11 a cut-out diagram. In this example, two target objects are arranged at the distances of 1.5 and 2 metres away from the range finder. The ambiguity interval is 768 metres. The measurement is effected with 8 frequencies, the cells having a width of 0.1 metre and being filled with the weighting 1/3/1, i.e. the counter of a cell which corresponds to the distance $R_N(\phi_{ij}) = \phi_{ij}/2\pi \cdot \lambda_j/2 + N \cdot \lambda_j/2$, is incremented by three, and the counters of the adjacent cells are each incremented by one. The single-object phases are directly processed without sorting for association. In this example, the maximum counter readings are 24 and can be seen at the far left edge in FIG. 10. The cut-out diagram in FIG. 11 shows the two peaks in the middle of the figure. The correct distances 1.5 and 2 metres are assigned to the two cells with the highest counter readings.

Figure 12:
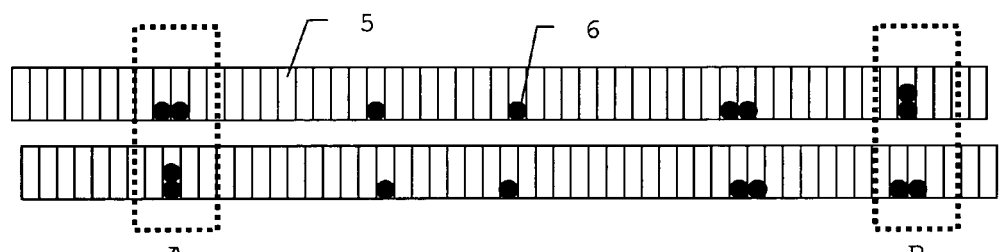
FIG. 12 shows the diagram illustrating the principle of a variant of the method according to the invention comprising two cell sequences displaced relative to one another and FIG. 13 shows the diagram illustrating the principle of a variant of the method according to the invention comprising an exemplary peak identification.

FIG. 12 shows the diagram illustrating the principle of a variant of a method according to the invention comprising two cell sequences displaced relative to one another for avoiding or resolving quantisation errors. The incrementation of the counter reading is effected here in parallel also for a further division of the ambiguity interval, which division is displaced by half the width of the cell 5 with regard to assignment to the distance. By means of this approach, for example, it is possible to better identify peaks which are divided on the basis of an unfavourable subdivision and assignment to a plurality of cells 5. This problem is illustrated in the zones A and B, in which in each case a peak forms for a cell sequence, which peak appears in the displaced cell sequence only as filling of two adjacent cells 5.

Figure 13:
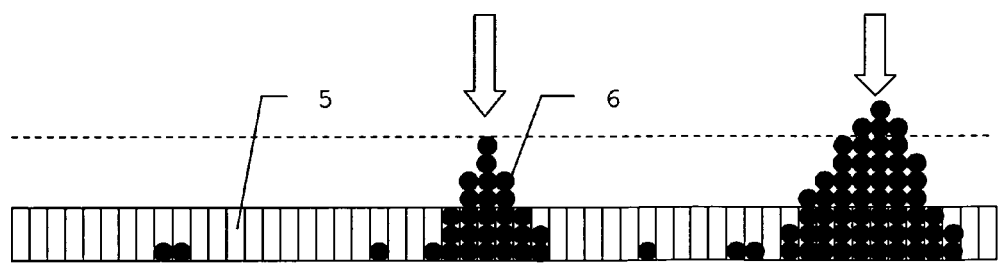

FIG. 13 shows the diagram illustrating the principle of another variant of the method according to the invention comprising an exemplary peak identification. Owing to quantisation effects and inaccuracies of measurement, the cells 5 directly bordering the maximum peak contain a very large number of hits, which is shown here once again as a number of spheres 6. Pure orientation with respect to the cells 5 with the highest counter reading would in this example identify for the right peak a total of three cells which are above the highest counter reading of the left peak. If these three cells are assigned in each case to three targets only on the basis of their counter readings, the three directly adjacent target identifications give a false solution which furthermore is not unambiguous since three cells come into question for the two targets to be identified. In order to avoid this false solution, the formulation stipulates that all cells 5 in the environment of a peak which has been found cannot be accepted as a target if the number of hits decreases monotonically. Thus, the values directly adjacent to the highest counter reading are suppressed and the cell 5 assigned to the left peak and having the highest counter reading is identified as belonging to the second target. The method therefore begins with the highest counter reading and searches for the next highest counter reading, all counter readings within the monotonically decreasing region around the absolute maximum being suppressed. With the identification of the next peak, in the three-target case, all counter readings within the monotonic region would also be suppressed there and finally the cell 5 with the third highest counter reading outside the excluded regions would be found as the third target distance.

The invention claimed is:

1. A method for multi-target-enabled resolution of phase ambiguities, comprising:
   emitting a periodic signal to at least two objects present within an ambiguity interval, the signal having at least $J \geq 2$ wavelengths $\lambda_j$ with $1 \leq j \leq J$;
   receiving the signal reflected by the objects;
   deriving the phases $\phi_j$ as a phase shift for each of the wavelengths $\lambda_j$ from the received signal and decomposition into single-object phases $\phi_{ij}$ with $1 \leq i \leq I$ assigned to the $I \geq 2$ objects;
   dividing the ambiguity interval into cells of defined width, a counter reading and a distance being assigned to each cell and a counter reading distribution being derivable;
   incrementing the counter reading for the cells which are assigned to the possible object distance $R_N(\phi_{ij}) = \phi_{ij}/2\pi \cdot \lambda_j/2 + N \cdot \lambda_j/2$, the incrementation being effected for $N \in \mathbb{N}$ which can be assigned to the ambiguity interval as a periodicity control variable for all $N \in \mathbb{N}$ which can be assigned to the ambiguity interval and for all single-object phases $\phi_{ij}$; and
   determining an absolute object phase and/or a true object distance for at least one of the objects.

2. A method according to claim 1, wherein the periodic signal emitted is in the form of a light or sound wave having at least $J \geq 2$ modulated-on wavelengths $\lambda_j$ with $1 \leq j \leq J$.

3. A method according to claim 1, wherein, for the possible object distance assigned to a respective $N \in V$ and a respective single-object phase $\phi_{ij}$, incrementing the counter reading is effected for more than one cell with the use of a weighting function.

4. A method according to claim 1, wherein the incrementation of the counter reading is effected for the cells which are assigned to combinations of a T tuple comprising phases $\phi_{ij}$ with $T \leq J$, in particular for the two-component tuple with $T=2$ and incrementation of the counter reading for the cells assigned to $$\frac{\varphi_{ij_1}}{2\pi}\lambda_{j_1} + N_{j_1}\lambda_{j_1} \approx \frac{\varphi_{ij_2}}{2\pi}\lambda_{j_2} + N_{j_2}\lambda_{j_2},$$

where $j_1 \neq n_2$ and $j_1, j_2 \leq J$.

5. A method according to claim 1, wherein the incrementation of the counter reading is effected with the use of a laning method.

6. A method according to claim 1, wherein the determination of the absolute phase and/or of the true object distance to one of the objects is effected by identification of the highest counter reading.

7. A method according to claim 6, wherein one or more currently highest counter readings is continuously logged.

8. A method according to claim 1, wherein the determination of the absolute phases and/or of the true object distance to the objects is effected on the basis of an evaluation of the counter reading distribution by identification of maxima which can be assigned to the objects.

9. A method according to claim 1, wherein a coarse search run is effected for determining parameters for optimizing the choice of the width of the cells.

10. A method according to claim 1, wherein the width of the cells is chosen as a function of a specified accuracy of measurement and/or with a multiple resolution.

11. A method according to claim 1, wherein the incrementation of the counter reading is also effected for a further division of the ambiguity interval for a division shifted by half the width of the cell with regard to assignment to the distance.

12. A method according to claim 1, wherein the counter reading distribution is convoluted with a convolution kernel several times with $1^{st}$ or $2^{nd}$ order splines, after or during the incrementation.

13. A method according to claim 1, wherein the incrementation is effected taking into account confidence values for the single-object phases $\phi_{ij}$ taking into account a signal/noise ratio for the single-object phases $\phi_{ij}$.

14. A method according to claim 1, wherein, on division of the ambiguity interval, a plurality of divisions into cells of defined width are produced as frequency tables, each frequency table being assigned to a period and, in each period, the associated single-object phases $\phi_{ij}$ being sorted into the frequency table assigned to the period.

15. Computer program product comprising program code which is stored on a non-transitory machine-readable medium for carrying out the method of claim 1.

16. A computer program product according to claim 15, wherein a totality of the cells is represented by a frequency table by one of the following data structures: a field, a binary search tree, a hash table, a skip lists, and a tries.

17. A range finder comprising:
   at least one signal source for generating and emitting a periodic signal, the signal having at least $J \geq 2$ wavelengths $\lambda_j$ with $1 \leq j \leq J$;
   a receiver for receiving a reflected signal and for deriving a phase $\phi_j$ for each of the wavelengths $\lambda_j$ from the received signal; and
   evaluation electronics for resolving phase ambiguities, wherein the evaluation electronics include an integrated circuit having a switching logic with parallelized data processing configured to carry out the method of claim 1.

18. A range finder according to claim 17, wherein the signal source includes a laser source and the signal has at least $J \geq 2$ modulated-on wavelengths $\lambda_j$ with $1 \leq j \leq J$.

* * * * *

UNITED STATES PATENT AND TRADEMARK OFFICE
CERTIFICATE OF CORRECTION

PATENT NO. : 8,184,268 B2  
APPLICATION NO. : 12/095710  
DATED : May 22, 2012  
INVENTOR(S) : Seeger Page 1 of 1

It is certified that error appears in the above-identified patent and that said Letters Patent is hereby corrected as shown below:

In the Claims:

In Column 13, Lines 34-35, in Claim 1, delete "assigned to the $I \leq 2$ objects;" and insert -- assigned to the $I \geq 2$ objects; --, therefor.

In Column 13, Line 51, in Claim 3, delete " $N \epsilon V$ " and insert -- $N \in \mathbb{N}$ --, therefor.

In Column 13, Line 65, in Claim 4, delete "$j_1 \neq n_2$" and insert -- $j_1 \neq j_2$ --, therefor.

Signed and Sealed this  
Twenty-seventh Day of August, 2013

Teresa Stanek Rea  
*Acting Director of the United States Patent and Trademark Office*